United States Patent [19]

Black et al.

[11] Patent Number: 4,780,982
[45] Date of Patent: Nov. 1, 1988

[54] FISHING LINE DISPENSER

[76] Inventors: Wesley F. Black, 2402 15th Ave. W.;
Ronald L. Black, 2114 8th Ave. E.,
both of Williston, N. Dak. 58801

[21] Appl. No.: 22,859

[22] Filed: Mar. 6, 1987

[51] Int. Cl.⁴ .......................................... A01K 97/00
[52] U.S. Cl. .................................... 43/54.1; 242/137;
242/106
[58] Field of Search ......................... 43/54.1; 223/107;
242/137, 134, 106, 146, 129.5

[56] References Cited

U.S. PATENT DOCUMENTS 3,473,756 10/1969 Jones .................................. 242/137
4,555,862 12/1985 Panasewich ....................... 43/54.1

Primary Examiner—Nicholas P. Godici
Assistant Examiner—Carmine Cuda
Attorney, Agent, or Firm—James R. Young

[57] ABSTRACT

A fishing line dispenser having an elongated shaft that is pivotally mounted on a tackle box tray for pivoting from a folded storage position to an extended position where a spool of fishing line can be positioned on the shaft. A removable mounting frame has clips at each end for attaching the shaft to a partition of the tackle box tray. A shelf is provided on which the shaft lays in its folded-down position. Detent structures yieldingly maintain the shaft either in folded or extended position.

20 Claims, 4 Drawing Sheets

FISHING LINE DISPENSER

BACKGROUND OF THE INVENTION

1. Field of the Invention

This invention is generally related to line dispensers, and more specifically to a fishing line dispenser for a tackle box.

2. Background of the Invention

It is common knowledge that fishing line is generally packaged and sold on plastic spools. The usual procedure for replacing the fishing line in a reel is to connect the end of the line on the spool to the reel and then to wind the line off the spool and onto the reel with the reel winding mechanism. The process, while appearing to be quite simple, is really not so easy in practice, especially for one person to do it alone. The spool has to be held in place and allowed to spin in order to dispense the line in an orderly manner without tangling, yet it requires both of a person's hand just to hold the fishing rod and to operate the winding mechanism of the reel. Consequently, if there is no one available to help, some other device has to be found to hold the spool in a spinnable manner.

Finding some other device to hold the spool in that manner may not be a problem at home or in one's garage, but it can become a significant problem in the middle of a stream, by a like, or in a boat. Sometimes a tree branch, stick, or some other similar device can be found on which to mount the spool of fishing line, but if it is not stable, the fishing line, especially monofilament line, is likely to tangle. Consequently, the seemingly simple task of winding new line onto a fishing real can quickly become a frustrating, time-consuming experience.

SUMMARY OF THE INVENTION

Accordingly, it is a general object of this invention to provide a fishing line dispenser on which a spool of fishing line can be rotatably mounted in a stable manner so that it can spin about its axis to dispense the fishing line without having to be held by hand.

A more specific object of the present invention is to provide a fishing line dispenser that can be mounted on a conventional tackle box for conveniently mounting a spool of fishing line in a stable, rotatable manner.

Another specific object of this invention is to provide a fishing line dispenser on a fishing tackle box tray that is foldable from a compact configuration to an extended use configuration on which a fishing line spool can be rotatably mounted for dispensing line to a reel.

Additional objects, advantages, and novel features of this invention are set forth in part in the description that follows, and in part will become apparent to those skilled in the art upon examination of the following specification or may be learned by the practice of the invention. The objects and advantages of the invention may be realized and attained by means of the instrumentalities and in combination particularly pointed out in the appended claims.

To achieve the foregoing and other objects and in accordance with the purposes of the present invention, as embodied and broadly described herein, the apparatus of this invention may comprise a line dispenser that has an elongated shaft pivotally attached to a partition of a tackle box tray in such a manner as to be pivotal from a folded position adjacent the partition to an extended use position extending above the partition for receiving and holding a spool of fishing line in such a manner as to allow the spool to spin as fishing line is pulled from the spool. The line dispenser can have a frame with clips at each end adapted for attachment to the partition of the tackle box tray in a gripping manner with the elongated shaft mounted on a pivot pin extending outwardly from the frame. A shelf can also be provided on the side of the frame for supporting the shaft in its folded position. Detent structures are also provided to yieldingly maintain the shaft in either the folded position or the extended position.

BRIEF DESCRIPTION OF THE DRAWINGS

The accompanying drawings, which are incorporated in, and form a part of, the specifications illustrate the preferred embodiment of the present invention, and together with the description, serve to explain the principals of the invention. In the drawings.

THE DESCRIPTION OF THE PREFERRED EMBODIMENTS

Figure 1:
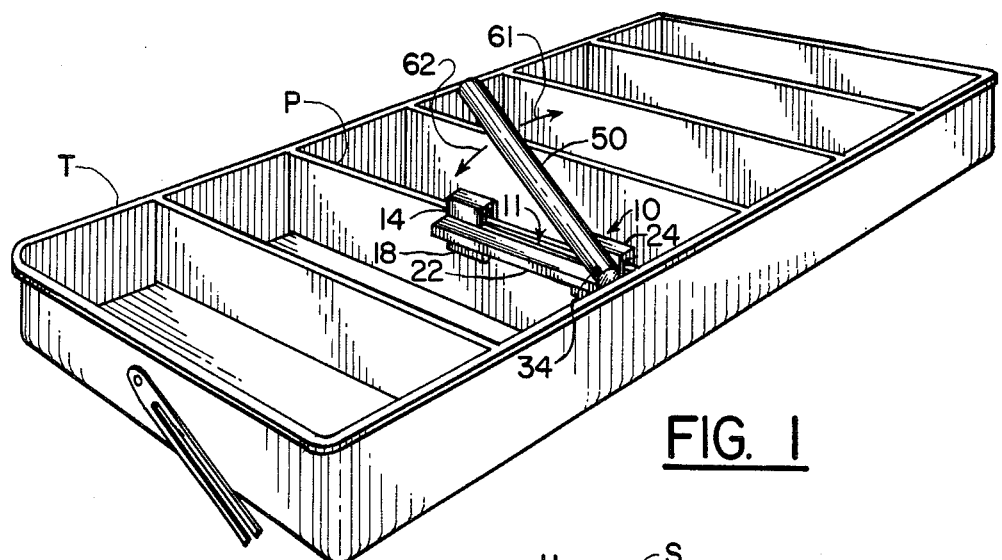
FIG. 1 is a perspective view of the fishing line dispenser according to this invention shown mounted in a conventional tackle box tray in partially unfolded configuration.

The fishing line dispenser 10 according to the present invention is shown in FIG. 1 mounted on a partition P in a conventional tackle box tray T. Essentially, the fishing line dispenser 10 is comprised of a mounting structure 11 adapted for mounting on the partition P and an elongated shaft 50 pivotally mounted attached to the mounting structure 11. As shown in FIG. 1, the shaft 50 pivots about a connecting pin 34 as indicated by arrows 61,62. In its storage or non-use position, the shaft 50 is pivoted in the direction of arrow 62 all the way down to lay on a shelf 22 in what is called herein a folded configuration. In its use position, on the other hand, the shaft 50 is pivoted about pin 34 in the direction of arrow 61 to the extended upright or vertical position shown in FIG. 2. When the shaft 50 is in the extended vertical use position shown in FIG. 2, a spool S of fishing line L can be mounted on the shaft 50 by lowering the spool S onto the line dispenser 10 in such a manner that the shaft 50 extends upwardly through the hole H in the core of the spool S. The spool S of fishing line L is shown in the mounted position on line dispenser 10 by the phantom lines S' and L' with the shaft 50 extending through the hole H indicated at H'. In this mounted position, the fishing line L can be pulled off the spool S as the spool S is held in this stable position and is allowed to spin about its longitudinal axis on shaft 50.

Figure 2:
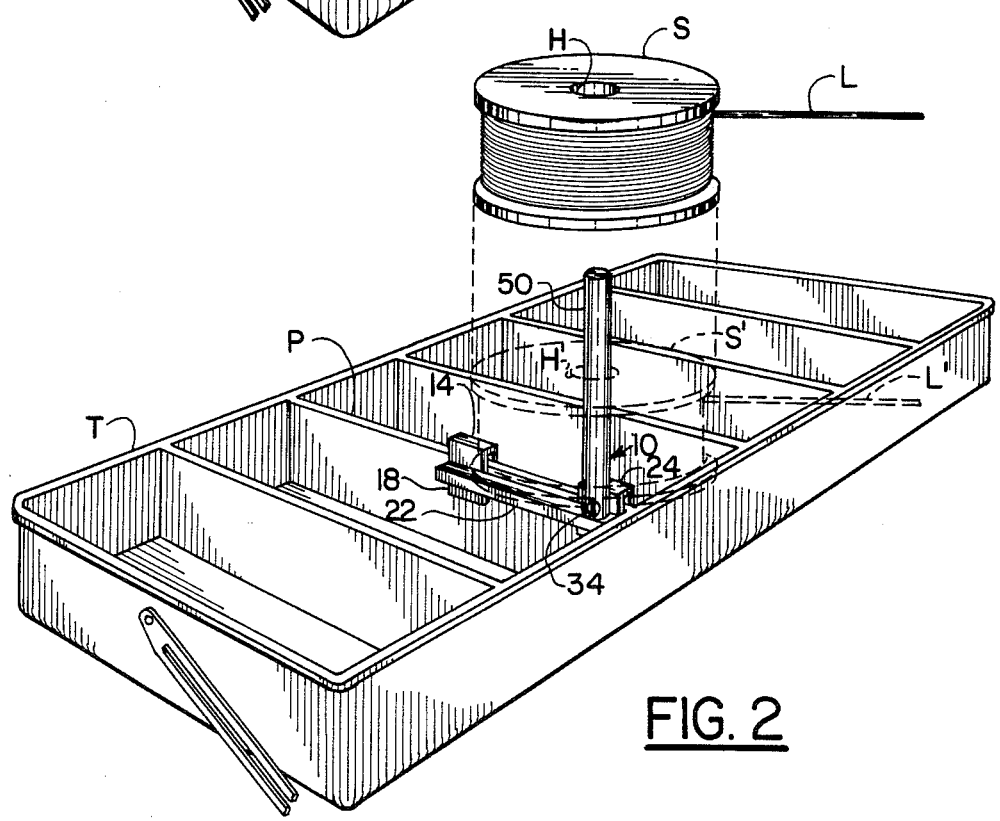
FIG. 2 is a perspective view similar to FIG. 1 showing the fishing line dispenser according to this invention fully unfolded to its extended position with a spool of fishing line shown mounted on the dispenser in phantom lines.
Figure 3:
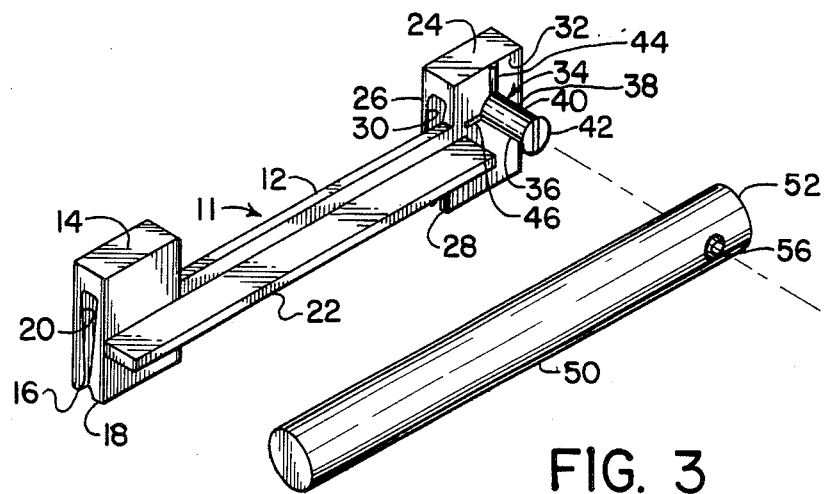
FIG. 3 is a perspective view of the fishing line dispenser of the present invention with the spool shaft removed.
Figure 4:
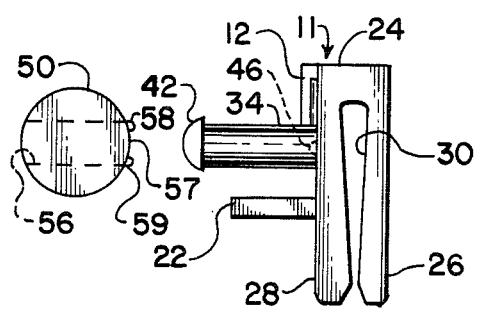
FIG. 4 is an end elevation view of the main frame components of the fishing line dispenser of this invention shown without the spool shaft.
Figure 5:
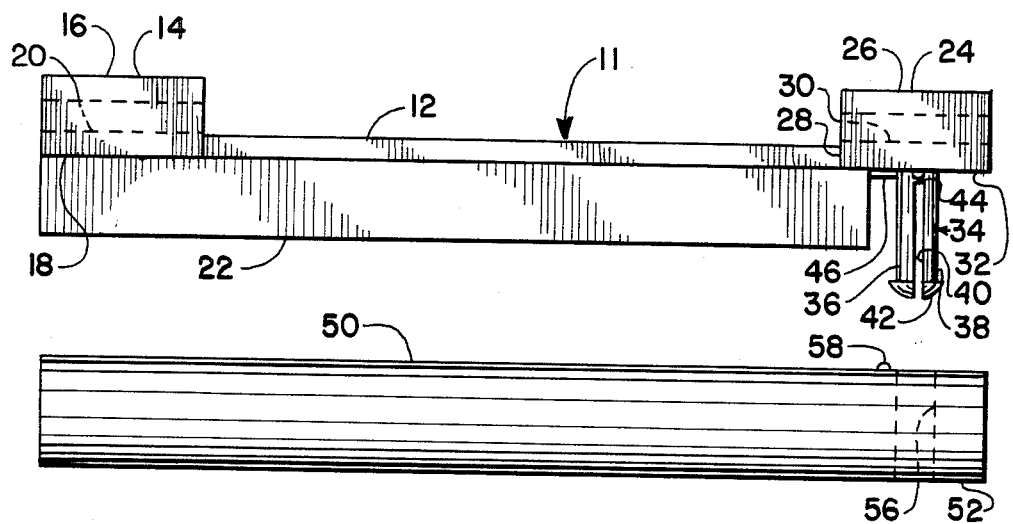
FIG. 5 is a top plan view of the main frame components of the fishing line dispenser of this invention shown with the shaft removed.

A more detailed description of the preferred structure of the line dispenser 10 according to the present invention is made by reference to FIGS. 3–6 in combination with FIGS. 1 and 2. Specifically, the preferred mounting structure 11 is comprised of a pair of clip devices 14, 24 mounted in spaced-apart relation to each other on opposite ends of an elongated frame bar 12. The first clip 24 has a body structure that is bifurcated into two adjacent leg members 26, 28 with a slotted opening 30 between the leg members 26, 28. The second clip 14 has essentially the same kind of body structure bifurcated through the midportion and bottom into leg members 16, 18 having a slotted opening 20 therebetween extending upwardly in the body 14 between the two leg members 16, 18. These first and second clips 24, 14, respectively, and their respective leg members 26, 28 and 16, 18 are preferably fabricated of a semi-rigid, resilient, material, such as a polyvinyl plastic. The slotted openings 20, 30 are preferably smaller at their bottoms than at their tops so that when the clips 14 and 24 are force mounted on the partition P, the partition P tends to push the legs 16, 18 and 26, 28 apart as it is inserted into the slotted openings 20, 30, respectively. The resiliency of the material then tends to bias the legs 16, 18 of clip 14 and the legs 26, 28 of clip 24 inwardly to grip the partition P in a secure manner.

The elongated shaft 50 is pivotally mounted at its proximal end 52 by a pin 34 extending laterally outwardly from the front face 32 of clip 24. In this preferred embodiment, the pin 34 is preferably bifurcated by a transverse slot 40 separating first and second portions 36, 38. The pin 34 has an enlarged head 42 at its distal end.

The elongated shaft 50 has a mounting hole 56 extending transversely through the shaft 50 near its proximal end 52. The diameter of the mounting hole 56 in shaft 50 is just large enough to allow the enlarged head 42 of pin 34 to slide therethrough when the bifurcated portions 36, 38 are forced together. The pin 34 is preferably fabricated of a fairly rigid yet resilient material, such as a polyvinyl plastic. Therefore, in attaching the shaft 50 to the frame 11, the bifurcated portions 36, 38 of pin 34 are squeezed together sufficiently to allow the enlarged head 42 to slide through the mounting hole 56 in the shaft 50. As soon as the enlarged head 42 passes all the way through hole 56, the resiliency of the pin 34 causes the bifurcated portions 36, 38 to spring away from each other so that the enlarged head 42 bears against the exterior surface of the shaft 50, thus preventing removal of the shaft 50 from the frame 11. Yet, the shaft 50 can pivot about the pin 34 as described above and as indicated by the arrows 61, 62 in FIG. 1. As mentioned above, a shelf 22 extending laterally outwardly from the front face of the mounting frame 11 provides a support surface on which the elongated shaft 50 can lay when pivoted in the direction of arrow 62 to the folded position.

Figure 6:
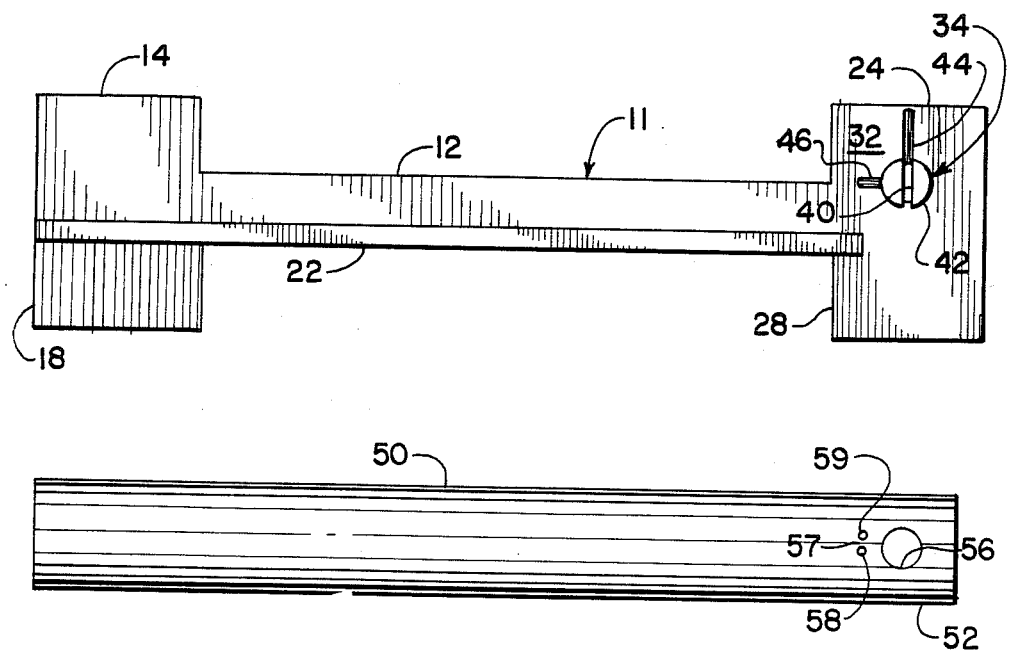
FIG. 6 is a front elevation view of the main frame components of the fishing line dispenser of this invention.

In order to enhance the structural stability and convenience of the fishing line dispenser 10, a detent mechanism is also provided to yieldingly hold the shaft 50 in either the folded position on shelf 22 or in the extended vertical use position illustrated in FIG. 2. This detent mechanism is best described by reference to FIGS. 3–6, with the note that the shaft 50 in FIG. 6 is shown rotated about its longitudinal axis 180 degrees in order to illustrate the detent structure. Specifically, the shaft 50 has a pair of small, rigid nodules 58, 59 extending outwardly from its peripheral surface adjacent the mounting hole 56. These nodules 58, 59 are spaced a small distance apart from each other leaving a detent space 57 between them. There are also two elongated ribs 44, 46 extending outwardly from the face 32 of clip 24. One of these ribs 44 extends radially upwardly from the pin 34, and the other of these ribs 46 extends radially sideways in the direction of the shelf 22 from the pin 34. These ribs 44, 46 are each just wide enough to fit in the detent space 57 between the nodules 58, 59 on the surface of shaft 50. Therefore, when the shaft 50 is pivoted to its folded position on shelf 22, the rib is forced into the detent space 57 so that the nodules 58, 59 yieldingly resist pivotal movement away from that folded position. Likewise, when the shaft 50 is pivoted to its vertical or upright position shown in FIG. 2, the elongated rib 44 is forced into the detent space 57 so that the nodules 58, 59 hold the shaft 50 in that vertical position and yieldingly resist pivotal movement away from that vertical position.

Therefore, when the shaft is in the upright position with a spool S of fishing line L mounted thereon the shaft 50 remains stable with the legs 16, 18 of clip 14 and legs 26, 28 of clip 24 tightly gripping the sides of the partition P and with the nodules 58, 59 and rib 44 holding the shaft 50 in a stiff, upright manner. Therefore, this fishing line dispenser 10 provides a secure mount for the spool S as the fishing line L is unwound from the spool S. On the other hand, when the shaft 50 is pivoted to the non-use or folded position on shelf 22, the shelf 22 in combination with the detent nodules 58, 59 and rib 46 hold the shaft 50 in the secure folded position where it is out of the way and does not become a nuisance or become entangled with other fishing lures and equipment (not shown) in the tackle box tray.

Figure 7:
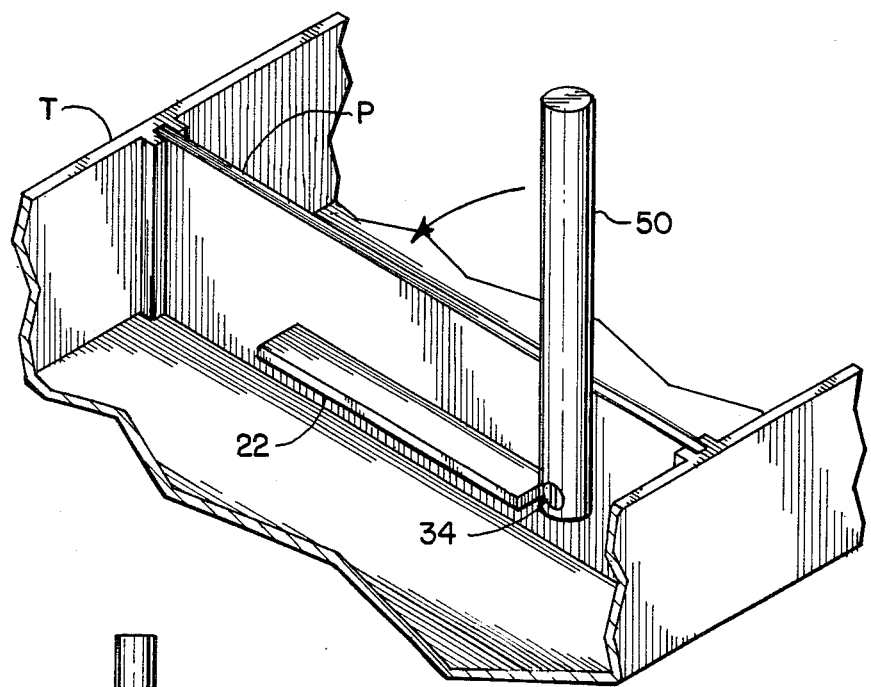
FIG. 7 is a perspective view of an alternate embodiment of the fishing line dispenser of this invention shown mounted directly on a partition in a tackle box.
Figure 9:
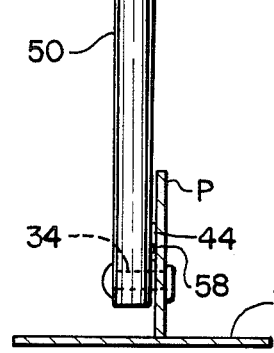
FIG. 9 is a cross-sectional view taken along lines 9—9 of FIG. 8.
Figure 8:
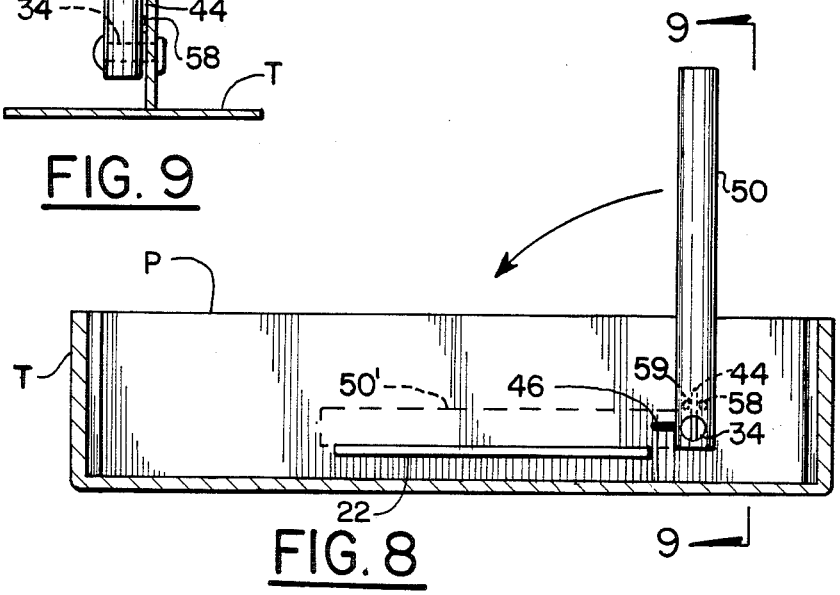
FIG. 8 is an elevation view of the alternate embodiment fishing line dispenser mounted directly on a partition of a tackle box.

An alternative embodiment of this invention is shown in FIGS. 7–9. In this alternate embodiment, the elongated shaft 50 is pivotally attached by bifurcated pin 34 directly to a partition P of the tackle box tray T. The elongated retainer ribs 44, 46 in this embodiment can be formed directly on the side of the partition P so that they cooperate with the nodules 58, 59 on shaft 50 to act as detents for the upright position as well as for the folded position indicated by phantom lines 50' in the same manner as the detent function described for the preferred embodiment above. A shelf 22 can be provided in this embodiment extending rigidly outward from the side of the partition P if desired, or, by deleting the shelf 22, the elongated shaft 50 can simply be folded to lay on the bottom of the tray T. Therefore, it can be appreciated that the shaft 50 in this alternate embodiment shown in FIGS. 7–9 can function to rotatably mount a spool of fishing line in the same manner as that described for the preferred embodiment above.

The foregoing description is considered as illustrative only of the principles of the invention. Further, since numerous modifications and changes will readily occur to those skilled in the art, it is not desired to limit the invention to the exact construction and processes shown and described, and accordingly all suitable modifications and equivalents may be resorted to falling within the scope of the invention as defined by the claims which follow.

The embodiments of the invention in which an exclusive property or privilege is claimed are defined as follows:

1. Line dispenser apparatus for mounting and holding a cylindrical spool of line having a hole through its longitudinal axis on a fishing tackle box equipped with a vertical tray partition member that has a top edge and a lateral surface in a manner that allows the spool to spin about its longitudinal axis as line is pulled off the spool, comprising:

an elongated shaft that has a proximal end pivotally attached to said partition member in such a manner that the distal end of said shaft is pivotal about said proximal end in a pivotal path from a folded position in which the distal end of the shaft is positioned adjacent the partition to a use position in which the distal end of the shaft extends outwardly from the partition and adapted for insertion through the axial hole in the spool; and first clip means for removably attaching said shaft to said partition, said first clip means having a bifurcated body with two downwardly extending legs adjacent each other with a space between said legs adapted to receive said partition in such a manner that the first clip means fits on the top edge of said partition with the partition extending into the space between said legs, the proximal end of said shaft being pivotally mounted to said first clip means.

2. The line dispenser apparatus of claim 1, wherein said bifurcated body with the two legs is fabricated of a semi-rigid, resilient material and the space between said legs is less than the thickness of said partition such that insertion of the partition into the space forces the legs apart and the resilience of the material causes the legs to grip the partition tightly.

3. The line dispenser apparatus of claim 1, including a pivot pin rigidly attached to, and extending outwardly from, said first clip means, and said shaft having a hole extending transversely therethrough adjacent the proximal end of the shaft, said shaft being pivotally mounted to said first clip means by said pivot pin extending through said trasverse hole in said shaft.

4. The line dispenser apparatus of claim 3, wherein said pivot pin is bifurcated with a space between opposite side portions and an enlarged head is formed on the distal end of each said side portion, said pivot pin being fabricated of a semi-rigid, resilient material and the heads of opposite side portions being sized to fit through said transverse hole in said shaft when the bifurcated side portions are squeezed together and too large to fit through said hole when they are not squeezed together.

5. The line dispenser apparatus of claim 3, wherein said pivot pin extends laterally outward from said bifurcated body such that the distal end of said shaft is positioned alongside said lateral surface of the partition when in the folded postition and extends upwardly above said top edge of the partition when pivoted to said use position.

6. The line dispenser apparatus of claim 5, wherein said removable attachment means also includes shelf means extending from said first clip means to a position alongside said lateral surface of the partition and in the pivotal path of said shaft for supporting said shaft in said folded position.

7. The line dispenser of claim 6, wherein said removable attachment means also includes second clip means for additional support of said shaft, said second clip means being positioned a spaced-distance from said first clip means in the same general direction as said shelf means and is connected to said first clip means by a frame structure extending between said first and second clip means.

8. The line dispenser apparatus of claim 7, wherein said shelf means is a part of said frame structure and extends laterally outward from the first and second clip means.

9. The line dispenser apparatus of claim 7, wherein said second clip means includes a bifurcated body with two downwardly extending legs adjacent each other with a space between said legs, said bifurcated body and legs being fabricated of a semi-rigid, resilient material and the space between said legs being less than the thickness of said partition such that insertion of the partition into the space between the legs forces the legs apart and the resilience of the material causes the legs to grip the partition tightly.

10. Line dispenser apparatus for mounting and holding a cylindrical spool of line having a hole through its longitudinal axis on a fishing tackle box equipped with a vertical tray partition member that has a top edge and a lateral surface in a manner that allow the spool to spin about its longitudinal axis as line is pulled off the spool, comprising:

a frame body with clip means thereon for attaching said frame body to said partition;

an elongated shaft that has a proximal end pivotally mounted on said frame body in such a manner that the distal end of said shaft is pivotal about said proximal end in a pivotal path from a folded position in which the distal end of the shaft is positioned adjacent the partition to a use position in which the distal end of the shaft extends outwardly from the partition and adapted for insertion through the axial hole in the spool;

a pivot pin attached to, and extending outwardly from, the side of said frame body, said shaft having a transverse hole through its proximal end and being pivotally mounted to said frame body with said pivot pin inserted through said transverse hole in said shaft so that a side of said shaft is positioned adjacent said frame body; and position retaining means on said frame body and shaft for yieldably maintaining the shaft in the extended use position.

11. The line dispenser apparatus of claim 10, wherien said position retaining means includes a detent structure comprising a rigid rib protruding from said frame body toward said shaft and two spaced-apart nodules on the surface of said shaft adjacent the frame body, said nodules being aligned with said rib such that said rib engages said nodules and is positioned between the nodules when the shaft is pivoted to the desired position.

12. Line dispenser apparatus for mounting and holding a cylindrical spool of line having a hole through its longitudinal axis on a fishing tackle box equipped with a vertical tray partition member that has a top edge and a lateral surface in a manner that allow the spool to spin about its longitudinal axis as line is pulled off the spool, comprising:

an elongated shaft that has a proximal end pivotally attached to said partition member in such a manner that the distal end of said shaft is pivotal about said proximal end in a pivotal path from a folded position in which the distal end of the shaft is positioned alongside said lateral surface of the partition to a use position in which the distal end of the shaft extends upwardly above said top edge of the partition and adapted for insertion through the axial hole in the spool;

a pivot pin extending outwardly from said lateral surface of said partition, said shaft having a hole extending transversely therethrough adjacent said proximal end and being pivotally mounted adjacent said partition with said pivot pin extending through said hole, and shelf means extending laterally outward from said lateral surface of the partition in the pivotal path of said shaft for supporting said shaft in said folded position.

13. The line dispenser apparatus of claim 12, including a detent structure having a rigid rib protruding from said lateral surface of said partition toward said shaft and two closely spaced-apart nodules protruding from the side of said shaft toward said partition for yieldably engaging said rib, said rib being positioned to engage said nodules when said shaft is in the desired use position.

14. The line dispenser apparatus of claim 13, including a second rib protruding from said partition in a position to yieldably engage said nodules when said shaft is in the folded position.

15. Line dispenser apparatus for mounting and holding a cylindrical spool of line having a hole through its longitudinal axis on a fishing tackle box equipped with a vertical tray partition that has a top edge and a lateral surface in a manner that allows the spool to spin about its longitudinal axis as line is pulled off the spool, comprising:

an elongated frame member having a first end and a second end;

first clip means at the first end of said frame member and second clip means at the second end of said frame member, both said first and second clip means being adapted for mounting said frame member on said partition in a tight engaging manner;

an elongated shaft having a proximal end and a distal end, said shaft being pivotally mounted at its proximal end to said frame member in such a manner that it can be pivoted in a pivotal path from a folded position with its distal end positioned adjacent said partition to an extended use position with its distal end extending outwardly from said partition and adapted for insertion through the axial hole in the spool.

16. The line dispenser apparatus of claim 15, including shelf means extending outward from said frame member in said pivotal path for supporting said shaft in the folded position.

17. The line dispenser apparatus of claim 15, wherein each of said first and second clip means includes a bifurcated body with two legs extending downwardly in spaced-apart relation to each other and being fabricated of a semi-rigid, resilient material with the distance between the legs being less than the thickness of the partition such that insertion of the partition into the space betwen the legs forces the legs outwardly and the resilience of the material causes the legs to grip the partition.

18. The line dispenser apparatus of claim 15, wherein said shaft is pivotally mounted to a lateral side of said frame member in such a manner that one side of the shaft interfaces and slides over the lateral side of the frame member as the shaft is pivoted, said apparatus also including detent means on said frame member and on said shaft for yieldably retaining the shaft in a desired position.

19. The line dispenser apparatus of claim 18, wherein said detent means includes a rib protruding from said frame member toward said shaft and two closely spaced nodules protruding from said shaft toward said frame member to yieldably engage said rib, said rib being positioned to engage said nodules where said shaft is in the use position.

20. The line dispenser apparatus of claim 18, wherein said detent means includes a second rib on said frame member positioned to engage said nodules when said shaft is in said folded position.

* * * * *